July 22, 1969

S. M. CHODOSH 3,457,488

METHOD OF RECHARGING AN ELECTROCHEMICAL CELL

Filed Dec. 30, 1965

INVENTOR,
STEWART M. CHODOSH

United States Patent Office 3,457,488
Patented July 22, 1969

---

3,457,488
METHOD OF RECHARGING AN ELECTRO-CHEMICAL CELL
Stewart M. Chodosh, Lake Success, N.Y., assignor to Leesona Corporation, Warwick, R.I., a corporation of Massachusetts
Filed Dec. 30, 1965, Ser. No. 517,594
Int. Cl. H01m 47/00
U.S. Cl. 320—4                                  6 Claims

ABSTRACT OF THE DISCLOSURE

A method of and an apparatus for recharging a discharged consumable anode without deformation is described. More specifically, a replaceable and consumable metal anode which is is positioned within a nonconsumable cathode of an air depolarized cell is recharged by removing the discharged anode from the nonconsumable cathode, inserting the discharged anode in an eletrolyte bath external from the air depolarized cell, and applying an external potential to the anode against a counterelectrode positioned in the electrolyte. During the application of the external potential the anode is retained in a fixed position over substantially its entire surface area to prevent growth and/or deformation.

---

This invention relates to an improved method for externally recharging a metal anode for use in a metal-air or metal-oxygen battery. More particularly, the improved method comprises removing the discharged anode from the air or oxygen cell, inserting the anode in a suitable holder positioned in an electrolyte bath, said holder having means for fixedly retaining the anode under uniform pressure to maintain the initial anode configuration while still permitting free electrolyte across to the anode, and rechanging the anode against a counterelectrode. The anode is then ready for reinserting in a metal-air or metal-oxygen cell.

Secondary batteries of the galvanic type are well known in the art. These batteries employ a metal to metal couple such as in the nickel-cadmium or silver-zinc batteries. The aforesaid batteries are completely self-contained, that is, the components which take part in the electrochemical reaction are entirely within the battery. When the battery is discharged by placing it under load and drawing off an electrical current, both the anode and cathode are affected and undergo chemical change. Therefore, the most practical, if not most efficient, method of recharging the batteries is an in situ method, merely reversing the polarity of the battery and applying an external potential.

Although the aforesaid recharging of the battery externally is simple, several problems are encountered:

(1) A DC source of power is required at the site of the battery for the recharging;

(2) The cell is not completely regenerable, i.e., the cell cannot be completely drained of its potential electrical current, nor is it capable of being completely restored after numerous cycles; and (3) Although it is possible to apply a quick charge, the entire battery still must be out of service for at least a short period of time.

Therefore, in order to avoid at least some of the aforesaid problems, in the Oswin et al. copending application having even filing date, there is described a metal-air or metal-oxygen depolarized cell which possesses replaceable anodes. Such cells comprise a bicathode, an anode, an electrolyte between the anode and cathode, and means for retaining the replaceable anode and cathode in operable association. The bicathode is made up of a hydrophobic polymer membrane, such as polytetrafluoroethylene, which is gas permeable but impermeable to liquid, with a catalytic layer thereon which is in contact with the electrolyte of the cell. The anode, which is inserted in the bicathode, comprises a relatively dense porous metal sinter or the like. The electrolyte which preferably is maintained in a suitable matrix provides an ion conductive path between the anode and cathode.

In operation, air or oxygen passes through the polymer membrane, ionizes at the catalytic layer accepting electrons and forming hydroxyl ions which are transferred to the anode to complete the electrochemical reaction. A representative reaction where zinc is employed as the anode and the cell fed with oxygen, is as follows:

At the cathode:

$$\tfrac{1}{2}O_2 + H_2O + 2e \rightarrow 2OH^-$$

At the anode:

$$Zn + 2OH^- \rightarrow ZnO + H_2O + 2e$$

Total cell reaction:

$$Zn + \tfrac{1}{2}O_2 \rightarrow ZnO$$

As is apparent, for operation of the cell, it is necessary that the cathode be in contact with or accessible to air or oxygen.

Although it is possible as stated by Oswin in copending application Ser. No. 427,623, filed Jan. 25, 1965, to recharge the anode in situ, for such an operation it is still necessary to have a source of DC power available at the site of the battery. Therefore, since the bicathode does not undergo chemical or physical change, it is more convenient to merely replace the discharged anode and insert a new anode. However, although the battery is not out of service for any substantial period, and no external DC power source is necessary at the site of the battery, the replacement of the complete anode is relatively expensive.

Accordingly, it is an object of the present invention to provide a method for externally recharging a metal anode without damage thereto, permitting its reuse in a metal-air or metal-oxygen battery.

According to the present invention, a discharged anode is taken from the metal-air or metal-oxygen cell and placed in a suitable holder positioned in an electrolyte bath, which holder is designed to retain the structure in its initial configuration while permitting free electrolyte access. Recharging is then effected against a suitable counterelectrode such as a nickel sheet. Since the counterelectrode merely serves as a source for the generation of oxygen, it can be used repeatedly. Moreover, since the anode is not within the battery casing, it can be recharged rapidly, i.e., at gassing potentials, without consequent effects.

The present invention is particularly advantageous where the structures are employed as a source of power for communication units are vehicles in field operations. Thus, when the battery of air depolarized cells is discharged, the discharged anodes can be replaced with new or recharged anodes and the vehicle again ready for operation. The discharged anodes which comprise a relatively small part and the most inexpensive part of the battery can be recharged at a convenient location with an external source of DC power, with the major components of the power source being in continuous operation.

The improved method of charging the batteries will be more readily apparent from the following detailed discussion, with attention being directed to the accompanying drawing which shows the design of the novel battery, as well as the unit employed in retaining the anode while recharging. In the drawings, like numerals are employed throughout to designate like parts.

FIGURE 3 is the single cell of FIGURE 2 in cross-section showing the anode and cathode in operable association;

Figure 1:
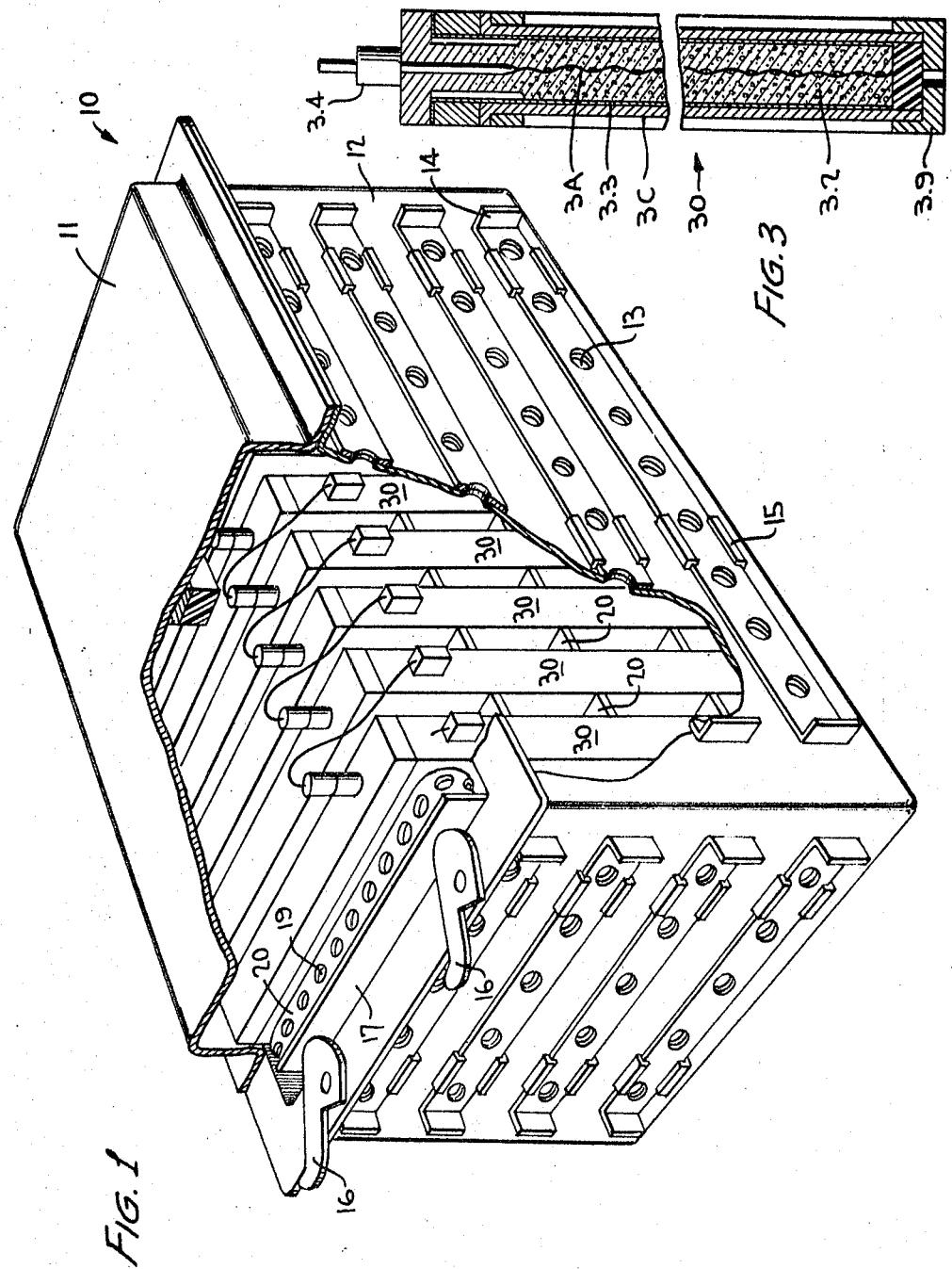
FIGURE 1 is a perspective view of one embodiment of the improved battery construction, with the housing partially broken away, wherein the design utilizes a toggle type clamp for holding the components of the cell stack in operable association, permitting rapid replacement of the anode.
Figure 2:
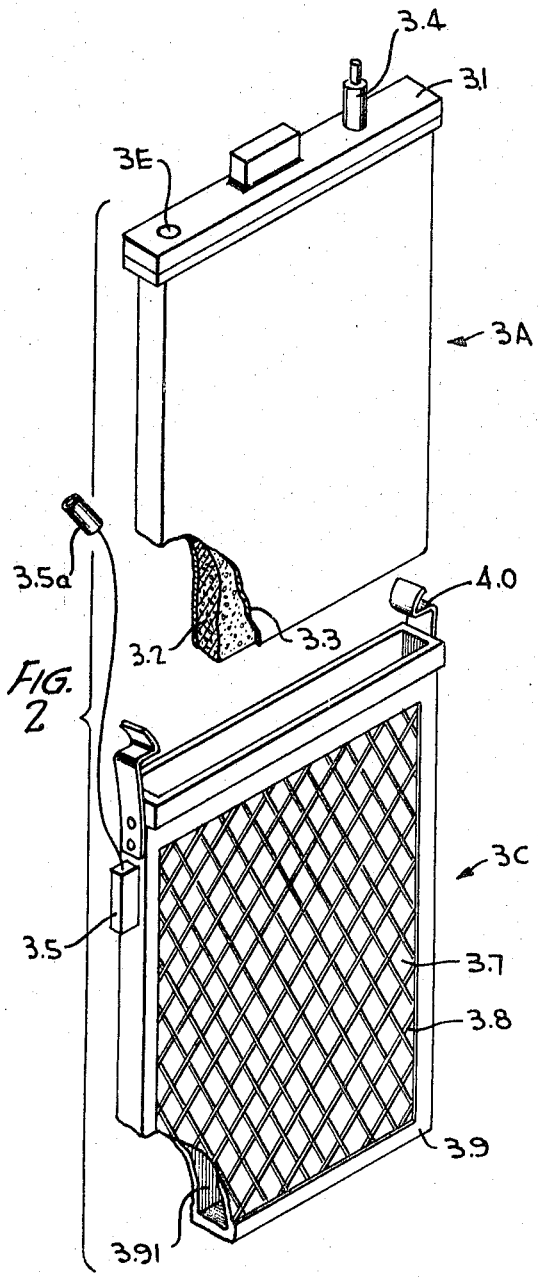
FIGURE 2 is an exploded perspective view of an individual cell partly in section.

More specifically, referring to FIGURE 1 of the drawing, reference numeral 10 designates a battery composed of a plurality of metal-air or metal-oxygen cells of the type shown in FIGURES 2 and 3. The battery comprises a cover 11 and an outer casing 12 containing openings 13 which permit access of air to the internal part of the battery. Openings 13 can be closed when the battery is not in operation by slides 14 mounted in brackets 15. The individual cells 30 are separated by intercell spacers 20. The intercell spacers are highly porous, permitting access of air between individual cells and to the bi-cathodes while still having sufficient structural strength to provide rigidity to the overall unit. An end plate 17 is at one end of the cell stack positioned away from the adjacent cell 30 by means of support 20 having openings 19 to permit passage of air to the cathode. Toggles 16 hold the end plates, individual cells and intercell spacers in operable contact when in a closed position and permit convenient removal of the several components when loosened.

FIGURES 2 and 3 designate an individual metal-oxygen or metal-air cell. The cell 30 comprises an anode 3A and a bicathode 3C. The bicathode comprises frame 3.9, a hydrophobic polymer membrane 3.7, a conductive support screen 3.8 which is on the internal side of the membrane, but in view of the thinness of the membrane, the configuration of the screen is readily apparent from the outer surface of the membrane, and a catalytic layer 3.91. The anode of the cell 3A fits into the bicathode 3C and comprises a top portion 3.1 and a porous sinter or sheet metal plate 3.2. Preferably a glassine paper or the like 3.3 completely covers the anode and electrically insulates the anode from the bicathode. Clamp 4.0 snaps over anode top 3.1 and holds the anode and bicathode in operable association. If the anode is porous, sufficient electrolyte is added to the cell through port 3E to fill the pores and impregnate separator 3.3. In the event a sheet metal anode is selected, electrolyte is added to the pocket of the bicathode and allowed to saturate separator 3.3 after the anode is in place, or the separator 3.3 is saturated with electrolyte prior to insertion of the anode. Anode lead 3.4 is connected to cathode lead 3.5 by means of socket 3.5a.

Figure 4:
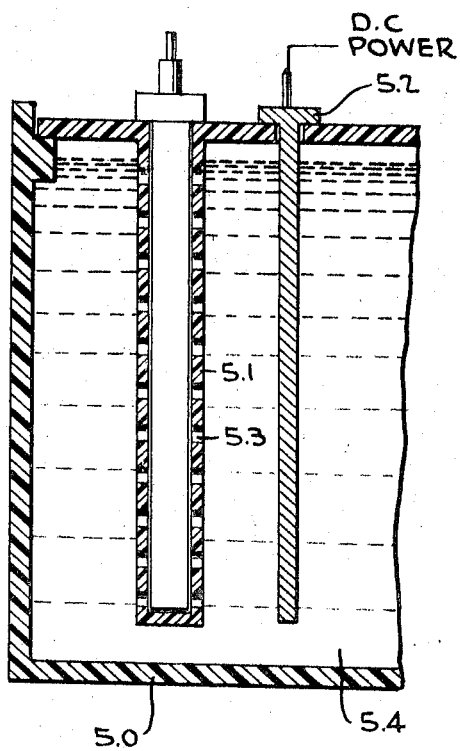
FIGURE 4 illustrates a device for recharging the anodes.

FIGURE 4 illustrates a container 50 containing electrolyte 5.4 in which anode holder 5.1 is positioned. Holder 5.1 contains porous openings 5.3 to permit access of electrolyte. Metal counterelectrode 5.2 is positioned in the electrolyte bath and connected to an external DC power source. Anode holder 5.1 is sufficiently rigid to maintain the anode in its original configuration during the charging operation.

The following detailed examples will more particularly illustrate the presently described method:

A zinc-air cell is constructed substantially as shown in FIGURES 2 and 3. The anode is of the porous zinc type containing minor amounts (up to 2 percent) of mercury. The cell had a theoretical amp-hrs. of 30.43. The cell when subjected to a series of discharge and charge cycles performed as follows:

| Discharge No. | Minutes discharged | Amp-hrs. discharged | Average voltage | Final voltage | Minutes recharged |
|---|---|---|---|---|---|
| 1 | 171 | 18.26 | 1.204 | 1.160 | 240 |
| 2 | 171 | 18.26 | 1.161 | 1.059 | 240 |
| 3 | 171 | 18.26 | 1.139 | 1.011 | 240 |
| 4 | 167 | 17.83 | 1.127 | 1.000 | 240 |
| 5 | 171 | 18.26 | 1.181 | 1.160 | 240 |
| 6 | 171 | 18.26 | 1.137 | 1.025 | 240 |
| 7 | 164 | 17.51 | 1.145 | 1.000 | 240 |
| 8 | 166 | 17.72 | 1.134 | 1.000 | 240 |

It will be apparent from the above table that the anode has been successfully discharged and charged externally.

The holder employed herein can be constructed of any suitable material including glass, plastics, or metal, and can have various configurations. As is apparent, however, if a conductive material is employed, suitable arrangements must be made to insulate the holder from the electrodes of the system. For this reason it is preferred that the holder be constructed from plastics such as polyethylene, polytetrafluoroethylene and the like.

Furthermore, the counterelectrode of the system can be constructed from various materials. It is only necessary that the counterelectrode complete the electrical circuit to allow current to pass from an external source to the anode being recharged. As will be apparent, the anode is effectively the cathode of the recharging system. The potential from the external source will be retained on the system until the anode is completely recharged. Preferably, a greater amount of energy is applied to the system than that taken off. These features will be readily apparent to one skilled in the art.

The bicathode employed herein, as more fully described in the aforesaid copending Oswin application Ser. No. 427,623, comprises a hydrophobic polymer membrane which is in contact with a conductive metal support screen or mesh and a catalytic layer. The polymer which is to be used can be any polymeric material which is hydrophobic and permits the passage of gas, but precludes the flow of aqueous materials. Exemplary polymers are the fluorinated hydrocarbons such as polytetrafluoroethylene, polytrifluoroethylene, polyvinyl fluoride, polyvinylidene fluoride, polytrifluoroethylene, the hydrophobic copolymers of two or more of the above materials or copolymers of such materials with acrylonitrile, methacrylate, polyethylene, and the like. The polymers normally will have a porosity of from about 15 to 85 percent and a uniform pore size distribution of from about 0.01 to about 100 microns, and a thickness of about 0.5 to 10 mils. The catalysts used to coat the hydrophobic polymers are the pure elements, alloys, oxides or mixtures thereof which are effective in promoting an electrochemical reaction. More specifically, operable materials include the elements, alloys, oxides, or mixtures of Group I–B, II–B, IV, V, VI, VII and VIII metals of the Mendelyeev's Periodic Table. The metal support screen can be any material which conducts an electrical current and which will withstand the corrosive environment of the battery. Such materials include nickel, zirconium, titanium, and tungsten screens, expanded meshes or the like. Moreover, it is possible to apply a hydrophilic polymer or other suitable hydrophilic material such as paper, over the catalytic layer which will be in contact with the electrolyte of the battery when in operation. Furthermore, in order to obtain a greater voltage from a given battery, it can be desirable to insert an insulating material in the bicathode to, in effect, provide two distinct cathodes. By connecting the cathodes of the cells in series, it is possible to obtain an increased voltage. Such cathodes as the term is used herein are still considered to be bicathodes. As will be apparent, if the cathode is separated by an insulating material, the anodes as well must be separated to form two distinct anodes, or one anode for each cathode.

The anodes which are to be used herein can be any conventional solid electro-conductor employed in a metal-oxygen cell such as metals, metalloids, alloys, and the heavy metal salts. It is only essential that the material selected be chemically reactive with a compatible electrolyte and be more electropositive than oxygen. Such materials include lead, zinc, iron, cadmium, aluminum and magnesium. From the standpoint of cost, capacity, and convenience, zinc is the preferred material. Although the anode can be in the form of a solid, or substantially solid metal sheet, it is preferred that the anode be porous. Porous anodes can be made, for example, by sintering select metal powders.

The cells and the recharging system will operate on conventional electrolytes including the alkaline materials such as sodium hydroxide, potassium hydroxide, mixtures of potassium and rubidium hydroxide and the like. Acid electrolytes including sulphur acid, phosphoric acid and hydrochloric acid can be employed. As is apparent, depending upon the particular electrolyte used, different anode materials can be selected. It is also feasible, and at times desirable, to employ an electrolyte in the cell which is trapped in a suitable matrix such as those made up of hydrophilic polymers, ceramic materials, and the like.

Although the current take off is not shown in the drawings, the current take off can be any conventional plug accessible through the metal casing. A convenient means of taking off the current will be readily apparent to one skilled in the art.

It should be appreciated that the instant invention is not to be construed as being limited by the illustrative embodiments. It is possible to produce still other embodiments without departing from the inventive concept herein disclosed. Such embodiments are within the ability of one skilled in the art.

It is claimed:
1. The method of generating electricity using a metal/air cell having a replaceable and consumable metal anode positioned within a nonconsumable cathode comprising the steps of discharging said consumable metal anode by applying a load to said metal/air cell, removing said discharged anode from said monconsumable cathode, inserting said discharged anode in an electrolyte bath ex- potential to said anode against a counterelectrode positioned in said electrolyte bath, and fixedly retaining said anode in said bath in such manner while applying said external potential to thereby retain the initial anode configuration, and reinserting said anode after charging into said nonconsumable cathode.

2. The method of claim 1 wherein the consumable metal anode is a consumable zinc anode.

3. The method of claim 2 wherein the electrolyte is an alkali hydroxide.

4. A method solely for revitalizing metal anodes removed from a discharged metal/air cell comprising a replaceable and consumable metal anode positioned adjacent to and having a configuration adapted to conform to a nonconsumable air depolarized cathode comprising the steps of inserting said discharged anode after discharge in and removal from said metal/air cell in the electrolyte bath external from said metal/air cell, applying an external potential to said anode against a counterelectrode positioned in said electrolyte bath, and fixedly retaining said anode in said bath in such manner while applying said external potential to thereby retain the initial anode configuration in order that said revitalized anode can be reinserted in said metal/air cell.

5. The method of claim 4 wherein the metal anode is a zinc anode.

6. The method of claim 4 wherein the electrolyte is an alkali hydroxide.

References Cited
UNITED STATES PATENTS

| | | | |
|---|---|---|---|
| 574,038 | 12/1896 | Marks | 204—297 |
| 1,126,665 | 1/1915 | Wilson | 320—2 X |
| 3,090,823 | 5/1963 | Roach | 204—286 X |

FOREIGN PATENTS 658,485　10/1951　Great Britain.

OTHER REFERENCES

Vinal: Storage Batteries, 4th ed., 1955.

JOHN F. COUCH, Primary Examiner.
S. WEINBERG, Assistant Examiner.

U.S. Cl. X.R.

136—164, 186; 204—297

PO-1050
(5/69)

UNITED STATES PATENT OFFICE
CERTIFICATE OF CORRECTION

Patent No. 3,457,488      Dated July 22, 1969

Inventor(s) Stewart M. Chodosh

It is certified that error appears in the above-identified patent and that said Letters Patent are hereby corrected as shown below:

Column 1, line 16, delete "is" second occurrence; and line 38, "rechanging" should read -- recharging --. Column 2, line 64, "are" should read --and--. Column 6, line 1, "monconsumable" should read -- nonconsumable --; between lines 2 and 3 insert -- ternal from said metal/air cell, applying an external --; and line 19, "the" should read -- an --.

SIGNED AND
SEALED
AUG 11 1970

(SEAL)
Attest:

Edward M. Fletcher, Jr.
Attesting Officer

WILLIAM E. SCHUYLER, JR.
Commissioner of Patents